Patented July 29, 1952

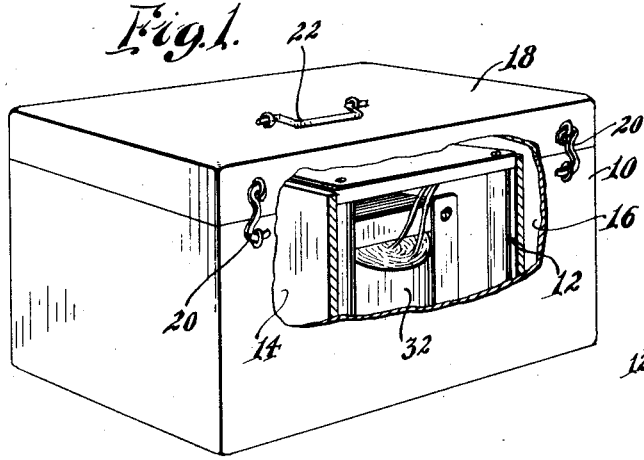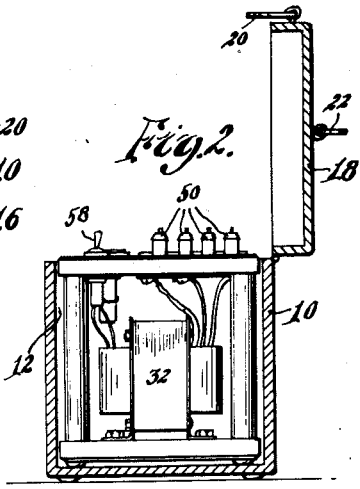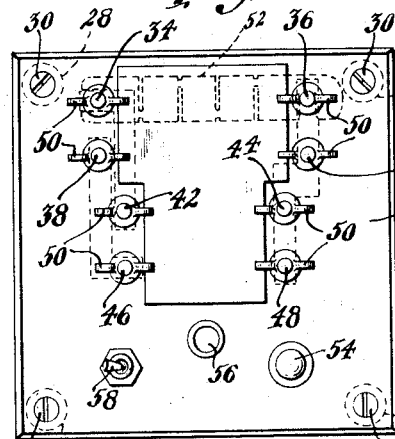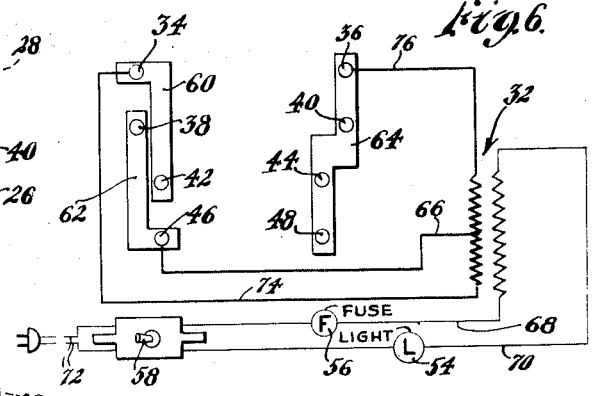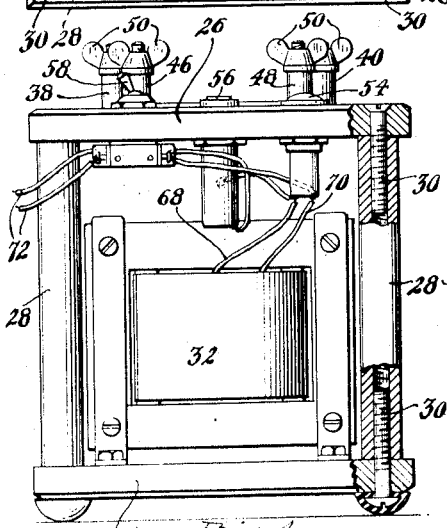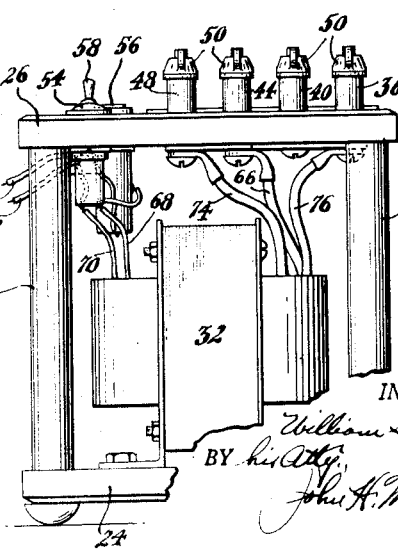

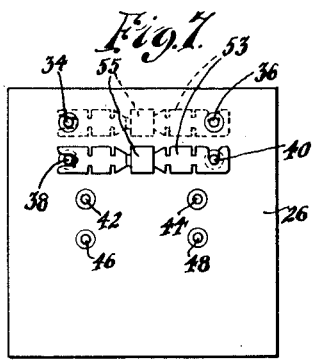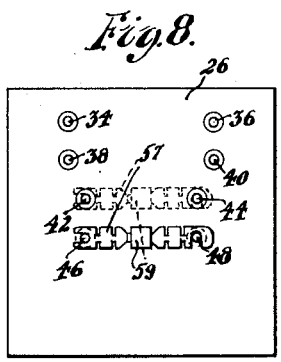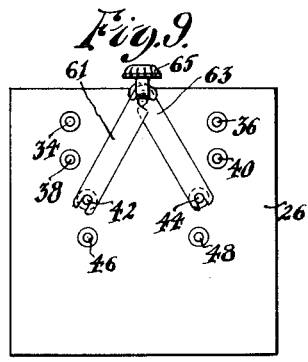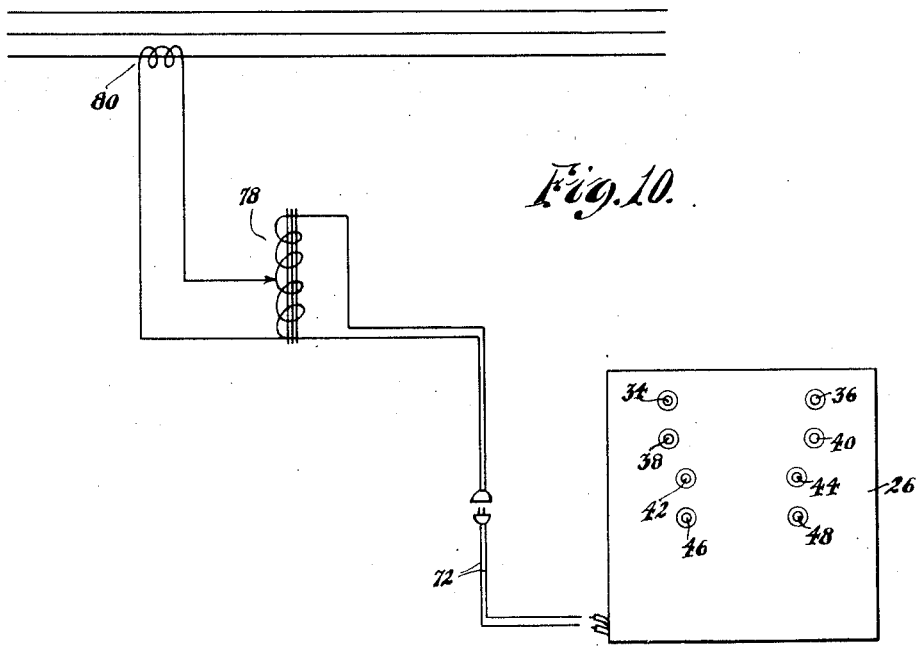

2,605,322

UNITED STATES PATENT OFFICE 2,605,322

APPARATUS FOR TESTING AND DEMONSTRATING CHARACTERISTICS OF FUSIBLE PROTECTIVE DEVICES

William S. Edsall, Cambridge, Mass., assignor to The Chase-Shawmut Company, Newburyport, Mass., a corporation of Massachusetts Application January 14, 1948, Serial No. 2,228

6 Claims. (Cl. 175—183)

This invention relates to apparatus for testing and demonstrating the protective characteristics of fuses and comparable protective devices for electric circuits. More particularly it provides apparatus, which may be readily portable, wherein both moderate and severe overload conditions of electric circuits may be simulated, and wherein the current-carrying and fusing characteristics of fuses, and the like, may be observed under moderate and/or severe overload conditions simulating overload conditions to which a fuse of particular rating may be subjected in a regular use of the fuse, or comparable device, for the protection of an electric circuit and the equipment therein.

Fuses for protection of electrical circuits and equipment are intended to interrupt the protected circuit in response to any abnormal circuit condition which, if permitted to continue, would do harm to the circuit, or the equipment therein. Hence, fuses are designed, calibrated and rated for satisfactory use only under conditions of voltage and current commensurate with the indicated rating of any particular fuse. If a circuit is under-fused, unnecessary service interruptions will be occasioned due to inability of the fuses to withstand the normal and useful circuit loads. On the other hand, over-fusing of a circuit may permit injurious overloads to continue and cause serious damage because the fuses may be designed to withstand the amperages of the particular overloads.

Yet some over-fusing of circuits is a practical necessity due to the equipment which customarily is operatively connected in electrical circuits. An electric motor, for example, will be found in almost every present day circuit. When an electric motor of 10 ampere rating is started, a surge current approaching 600% of the rated amperage of the motor is suddenly impressed on the circuit. But when the motor attains its normal operating speed, the circuit drops back to a normal load condition. If such a circuit were fused with 15 ampere fuses, one or more of the fuses would be blown each time the motor was started, notwithstanding that the surge current would drop off, and the circuit return to normal load, in a relatively short period of time, in the absence of a circuit interruption by one or more of the fuses. A motor-starting overload, while it may be substantial, ordinarily is not injurious if it persists only for the relatively few seconds it takes the motor to attain its normal operating speed, and other comparable overloads of relatively short duration produce no appreciable harmful effects. However, even a moderate overload, if permitted to continue beyond a predetermined period of time may cause serious damage to insulation, fuse clips, switches, and other equipment and devices in the circuit.

It has been a problem of fuse manufacturers to produce fuses which can provide adequate protection of circuits and equipment against both severe overloads and injurious moderate overloads while avoiding unnecessary service interruptions due to non-injurious overloads.

So-called time-delay fuses have been developed which permit fuse ratings to be set closer to the ratings of motors or circuits which are to be protected, as compared with prior fuses which were required to have ratings 125 to 300 percent greater than the ratings of motors or circuits which were being protected. The National Electrical Code has recognized this definite advantage of time-delay fuses by reducing the permissive over-fusing in the 1947 Code as compared with prior issues. But the amount of time-delay provided in time-delay fuses, of the same rating, made by different manufacturers, varies considerably. It is important to know how much time-delay any particular fuse is designed to provide on moderate overloads, and it is a definite practical advantage to be able to determine and compare the time-delay and other fusing characteristics of different types of fusible devices having the same ratings. Also, it is a definite practical advantage to be able to visually demonstrate these characteristics to salesmen, prospective customers, and others, especially for comparison purposes in considering the desirability of one type of fusible device over another for a particular installation, and the advantages of fusible devices on one manufacturer as compared with similarly rated fuses of another manufacturer.

Hence, it is an object of the invention to provide a conveniently portable apparatus having provision therein for simulating relatively heavy overload conditions and moderate overload conditions of electrical circuits, with means for visually subjecting fusible devices to selective simulated overloads and thereby demonstrate current-carrying and fusible characteristics of the devices at a convenient place where the action of any particular fusible device readily may be observed as a simulated overload current is passed therethrough.

An important feature resides in the fact that the time-delay of any particular fusible device under test in the apparatus may be observed and be timed by a stop-watch or other timing mechanism for comparison with comparable devices of the same rating which may be of a different design and/or of different origin of manufacture.

Another object is to provide a testing and demonstrating unit for fusible devices wherein a fusible device quickly and safely may be mounted in a visible position and be fused under conditions simulative of overload conditions against which the fusible device is intended to provide protection in a regular electrical circuit.

A further object is to provide a testing and demonstrating unit for fusible devices wherein a plurality of fusible devices of the same rating may be connected in series and be subjected to a current simulative of an overload current of a character to which such fusible elements may be subjected in regular service circuits, thereby to cause fusing of whichever one of the series-connected devices has the lesser amount of time-delay under the particular simulated overload condition.

Yet another object is to provide a testing and demonstrating apparatus for fusible devices wherein means is provided for converting actual line current surges to modified surges simulative of the actual surges, and for fusing a fusible device in response to the simulated surge, thereby to demonstrate the fusing characteristics of the fusible device under the actual surge condition.

It is, moreover, a purpose and object of the invention to provide a testing and demonstrating apparatus which can provide visual as well as factual evidence of the protective and fusing characteristics of fusible devices, and more particularly of their responsiveness under heavy and moderate overload conditions, and of their time-delayed action for carrying over the normal surge-current conditions unless any particular surge continues beyond a predetermined period of time.

In the accompanying drawings:

Fig. 1 is a perspective view of a portable testing and demonstrating apparatus embodying features of the invention, portions of the casing being broken away to show the interior unit;

Fig. 2 is a cross-sectional view approximately on line 2—2 of Fig. 1, but showing the cover of the casing open;

Fig. 3 is a top plan view of the inner unit of Figs. 1 and 2, shown removed from its casing, and on a larger scale;

Fig. 4 is a side elevation of the unit of Fig. 3, looking at the side which is lowermost in Fig. 3;

Fig. 5 is a side elevation of the unit of Figs. 3 and 4, looking at the side facing to the right in Figs. 3 and 4;

Fig. 6 is a diagrammatic view illustrating the electrical connections of the unit of Figs. 3–5;

Figs. 7, 8 and 9 are diagrammatic plan views of the unit of Figs. 3–5, illustrating various testing and demonstrating procedures; and Fig. 10 is a diagrammatic view showing a clamp-on transformer and a variable transformer associated with the unit of Figs. 1–3 for subjecting a fusible element to a modified surge current taken, through the clamp-on transformer, as an actual line surge.

Referring to the drawings, the invention as represented in Figs. 1–9 conveniently may be embodied in a demonstrating unit which readily can be inserted in and removed from a carrying box 10, whose interior is shown partitioned to provide a central compartment 12 for holding the demonstrating unit, and two end compartments 14, 16 which may hold a quantity of fuses, a clamp later to be described, and the plug-in cord of the demonstrating unit. The box may have a hinged cover 18, cover fasteners 20, and a suitable handle 22 by which the box and contents may be carried from place to place.

The demonstrating unit is shown in Figs. 3–5 removed from its carrying box 10. The unit has an insulating base plate 24 and an insulating top plate 26 secured together in spaced generally parallel relation by the posts 28, against the opposite ends of which the plates 24, 26 are clamped by the screws 30.

A transformer 32 is mounted on base plate 24, and the binding posts 34, 36; 38, 40; 42, 44; and 46, 48 are arranged in pairs at the upper face of the top plate 26, each with a thumb-nut 50 threaded on its upper end for clamping a fuse link across any selected pair of the binding posts. A fuse link is shown at 52 in Fig. 3 dotted in position across the binding posts 34, 36. Also provided on top plate 26 is a signal light 54, a protective fuse 56, and a control switch 58.

The under face of top plate 26 is equipped with the conducting strips 60, 62 and 64 which are best shown in the diagrammatic representation of Fig. 6. Strip 60 is connected to the binding posts 34 and 42 while strip 62 is connected to the binding posts 38 and 46. Strip 64 connects the binding posts 36, 40, 44 and 48 in series.

The transformer 32 will be designed to meet the requirements of any particular demonstrating unit. For example, in a unit intended to be plugged into an available electrical outlet in an office or comparable place in which a demonstration is to be performed, the transformer 32 preferably will be designed so that the maximum primary current it can draw from the source of energy will approximate five amperes, so that the customary 15 ampere fuses in the office circuit will not be over-taxed by the introduction of the demonstrating unit in a circuit which presumably already is partially loaded due to other equipment therein. The transformer will be designed so as to be capable of delivering a secondary current of magnitude to simulate a relatively heavy overload condition when directed through a fuse of the maximum rating which the demonstrating unit is expected to handle. Hence, in a unit for testing and demonstrating the operating and fusing characteristics of fusible devices having up to 100 ampere ratings, the transformer 32 preferably will deliver a secondary current of at least 300 amperes so as to be capable of simulating a relatively heavy overload condition in a circuit which normally would be protected by 100 ampere fuses. However, the secondary coil will have a center tap, as at 66 in Fig. 6, whereby a secondary current approximating 150 amperes is made available for simulating relatively heavy overload conditions of circuits which normally would be protected by fuses having ratings up to 30 amperes, for example, and for simulating relatively moderate overloads of circuits which normally would be protected by fuses having ratings from say 31 to 60 amperes.

As best seen in Fig. 6, the primary of transformer 32 has its terminals connected by the conductors 68, 70, to the control switch 58 from which extend the conductors 72 of a plug-in cord. The signal light 54 and protective fuse 56 are in series with the primary winding of the transformer.

The secondary of transformer 32 has one terminal connected by conductor 74 to conductor strip 60, and has its other terminal connected by conductor 76 to conductor strip 64. The center tap 66 of the secondary is connected to conductor strip 62.

It is a feature of the invention that anyone interested in the operating and fusing characteristics of fusible devices, such as fuse links, may, with the apparatus of Figs. 1–9, quickly and conveniently conduct a series of demonstrative tests of fusible devices under different conditions simulative of abnormal conditions to which the fusible devices are likely to be subjected in actual service, and the fusible devices under test may be watched as the simulated abnormal current is directed through them. For example, actual fusing of fuse links in response to both a simulated relatively heavy overload condition and to a simulated relatively moderate overload may be observed, and the time-delay, particularly under prolonged moderate overload, may be accurately timed by a stop-watch or the like. Such a demonstration by a fuse salesman, using his own product in the tests, enables him to satisfy and convince himself, by actual test and observation, of the operating and fusing characteristics of his product. Perhaps more important, he similarly can test and observe the operating and fusing characteristics of competing fuses and demonstrate to his own satisfaction such points of advantage as there my be in his product over the competing fuses. Actually, he can conduct demonstrative tests with his own and competing fuse links of like rating connected in series, and actually observe the fusing of whichever link responds quickest to open a circuit on heavy overload and, in the case of moderate overloads, can observe and time the delayed fusing of whichever series-connected link provides the smaller time-delay.

However, a primary purpose of the apparatus of the invention is for demonstrating the operating and fusing characteristics of fusible devices, such as fuse links, to customers and prospective customers. For example, in discussing the merits of his product, a salesman may make a statement to a customer or prospective customer to the effect that a particular motor circuit in the customer's factory will receive more adequate and satisfactory protection with the fuses which are being offered by the salesman than by fuses of like rating put out by other manufacturers. A prospective customer, not familiar with the facts, naturally will be skeptical of the salesman's claims of superiority. But with the apparatus of the invention, and assuming his statement to be true, the salesman quickly, safely and effectively can visibly demonstrate the accuracy of his statement while the prospective customer remains comfortably seated at his desk and observes the response of actual fusible elements of the fuses in question to simulated heavy overload and moderate overload conditions. He can actually see and compare the fusing action of fuse links of like rating made by different manufacturers. He can see the fuse links interrupt a circuit substantially instantaneously when subjected to simulated short circuit or heavy overload conditions, and can observe and note the time delay before circuit interruption when the links are subjected to simulated moderate overload conditions. Furthermore, the salesman's fuse link and a fuse link of like rating of any particular competitor may be connected in series in the apparatus, and the result can be observed as a simulated heavy overload or moderate overload is directed through the series-connected links. Obviously, the link having the smaller time-delay will interrupt the circuit in each case, a demonstration which is particularly convincing under simulated moderate overload conditions because it definitely settles any question as to which of the series-connected links has the greater time-delay on moderate overloads. Any substantial time-delay on heavy overloads of short circuit magnitude is a condition to be avoided, inasmuch as it is requisite to the safety of the circuit and apparatus therein that the circuit be interrupted substantially instantaneously in response to any such heavy overload. Hence it is a primary problem of the fuse manufacturer to provide this substantially instantaneous interruption in response to heavy overloads, with a maximum time-delay of interruption on moderate overloads which usually are temporary in character.

In use of the apparatus of Figs. 1–9, any convenient electrical outlet of a 110 volt alternating current line may serve as a source of electrical energy for the demonstrating apparatus. The particular apparatus herein represented is designed for use only with alternating current although, obviously, a conventional device for converting from direct to alternating current may be introduced, or the apparatus itself may be built initially for use with direct current or for use with either alternating or direct current, according to well known procedures.

Referring to Fig. 3, the represented fuse link 52 is shown connected across the binding posts 34, 36 and may be considered to have a 250 volt 100 ampere rating, being designed to protect circuits of 61–100 amperes and 250 or less voltage. Actually, a fuse link of the mentioned rating is designed to carry considerably more than the rated 100 amperes for limited periods of time without fusing. A short circuit or the like in a circuit protected by such a fuse link may cause a current of several times the rated 100 amperes to be directed through the fuse link, in which case it is requisite that the link shall fuse substantially instantaneously and open the circuit. The illustrated apparatus is not designed to simulate a short circuit through a 100 ampere link but its 300 ampere secondary current is simulative of a relatively heavy overload through such a link, and continuance of the overload beyond a predetermined period of time would be injurious to the circuit and equipment.

Hence, in Fig. 3, the 100 ampere fuse link 52 preferably should carry the 300 ampere secondary current of the unit for a limited period of time but should fuse and open the circuit if the overload continues beyond a predetermined period of time. Inasmuch as this overload represents a relatively heavy overload for a 100 ampere fuse link, the time-delay before fusing occurs will be but a few seconds, but it is desirable to make the time-delay as long as possible commensurate with a fuse link design which will provide substantially instantaneous circuit interruption on overloads of short-circuit severity. The amount of time-delay of the fuse link 52 in Fig. 3 may be determined, while actual delayed fusing of the link is observed, in response to the simulated relatively heavy overload, and comparative tests may be made with other links of the same rating.

The 100 ampere fuse link 52 of Fig. 3 may be mounted across the binding posts 38, 40, and be subjected to the 150 ampere secondary current of the unit, for a test on relatively small simulated overload, but the 150 ampere current represents such a small overload on a 100 ampere fuse link that fusing will not occur for something well over one-half hour, which is an impractically long time for demonstrating purposes.

Fig. 7 illustrates a 60 ampere commercial variety of time-delay fuse link 53 having a relatively low melting temperature solder mechanical cut-out device 55 therein which is adapted to open a circuit in response to overloads of predetermined character, while one or both of the notched fuse link sections are adapted to fuse at one or more of their fusing necks in response to short circuit and other relatively severe overloads. Such a fuse link, and others of like rating, may be mounted across the binding posts 34, 36, as shown dotted in Fig. 7, and be subjected to the 300 ampere secondary circuit of the unit, thereby to visually demonstrate the fusing characteristics of the link 53 on relatively heavy overloads. Also the link 53 may be mounted in its illustrated full line position of Fig. 7, across the binding posts 38, 40, and be subjected to the 150 ampere secondary current, simulative of a moderate overload for such a fuse link. In its dotted position, the fuse link will fuse at one or more of its fusing necks, with an observable amount of time-delay. In its full line position, the circuit will be opened at the mechanical cut-out 55, with relatively long time-delay.

Obviously, other varieties and other makes of fuse links of the same rating may be subjected to the same test conditions, for comparison purposes.

Fig. 8 diagrammatically illustrates comparable test demonstrations of a fuse link 57 which may have a 30 ampere rating or less. In its dotted position the link 57 will be subjected to the 300 ampere secondary current of the unit and will fuse at one or more of its fusing necks substantially instantaneously because this current passed through a rated 30 ampere link is simulative of a short-circuit or other comparable severe overload. In the full line position of link 57 in Fig. 8, the 150 ampere secondary current is simulative of a relatively heavy overload which will cause opening of the circuit at the mechanical cut-out 59, with substantial time-delay.

Fig. 9 illustrates the manner in which two fuse links of the same rating may be connected in series across binding posts of the device. Two fuse links 61, 63 of like rating are represented in outline connected across the posts 34, 36, with the inner ends of the links clamped together by any suitable means, such as the conventional screw-clamp 65. Whichever link has the lesser amount of time-delay will fuse, and the fusing may be observed and timed as in the previously described tests. If the links are the products of two different manufacturers, any question as to which provides the greater amount of time-delay quickly can be visually determined and demonstrated. Comparable tests may be conducted with series-connected links of proper rating connected across the other binding posts.

While the unit illustrated in Figs. 1-8 is designed primarily for testing and demonstrating fuse link characteristics, obviously suitable means might be provided for mounting complete fuses for comparable tests and demonstrations with the complete fuses of either cartridge or plug type. Also the particular secondary amperages provided for the illustrated unit may be varied as desired or required for particular testing and demonstrating procedures.

Fig. 10 shows a unit of the type illustrated in the other views combined with a commercial "Variac" 78 and a commercial clamp-on transformer 80, thereby to provide for converting actual power line overload surges and directing the modified surge currents through a fuse link mounted in the demonstrating unit as heretofore described. By this means, the action of a fuse link may be observed as it responds to actual surge currents in a power line, but at suitably reduced voltage.

In conjunction with the apparatus illustrated and described, other known devices (not shown) conveniently may be employed for throwing on a screen or the like a picture of a fuse as it reacts in the demonstrating unit to a heavy or a moderate overload.

From the foregoing, it will be apparent that the invention provides apparatus which has important and valuable attributes for informing interested parties of the operative and fusing characteristics of fusible protective devices, and for actually visibly demonstrating those characteristics with regard to individual devices and series-connected comparable devices, for informative and comparison purposes.

I claim as my invention:

1. Apparatus for testing and visibly demonstrating the circuit-interrupting characteristics of fusible protective devices, comprising a portable support, a plurality of pairs of terminals at exposed locations on the support, the individuals of each pair being spaced apart and insulated from each other, means associated with the support and portable therewith adapted to be connected to a source of electrical energy and to produce a plurality of low-voltage relatively high amperage currents of which one has amperage at least 300% of the maximum amperage rating of the protective devices which are to be tested and another has amperage approximating one-half that of said one current, means for removably connecting a fusible protective device which is to be tested in a readily visible location across a selected pair of said terminals, and a manual switch associated with the support for directing the higher amperage low-voltage current through the protective device when the device is connected across one pair of said terminals and for directing the lower amperage low-voltage current through the protective device when the device is connected across another pair of said terminals, thereby to effect a visible circuit-interrupting action of a protective device at either of said pairs of terminals under a condition simulative of an actual fault condition in a service circuit.

2. Apparatus for testing and demonstrating circuit-protecting characteristics of fusible protective devices, comprising a transformer, portable means supporting the transformer and providing a table on which protective devices to be tested may be visibly arranged, a plurality of pairs of terminals at the exposed side of said table, means for removably connecting a protective device which is to be tested across a selected pair of said terminals, said transformer having means for connecting it to a source of electrical energy and being designed and adapted to transform the source current to a reduced voltage relatively high amperage secondary current having amperage approximating 300% of the maximum rated amperage of protective devices which are to be tested, connections from the opposite ends of the secondary winding of the transformer to the individuals of one of said pairs of terminals, connections from one end and a mid-point along the said secondary winding to the individuals of another of said pairs of terminals, and a manual switch for directing the full amperage of the secondary circuit through a protective device when connected across one of said pairs of terminals and for directing approximately half the full amperage of the secondary circuit through a protective device when connected across another of said pairs of terminals.

3. Apparatus for visibly subjecting fusible protective devices to currents simulative of abnormal currents against which the protective devices are designed to protect in regular service, comprising a support having a plurality of pairs of terminals at an exposed region of the support, means associated with the support for receiving relatively high voltage, low amperage current and delivering to one of said pairs of terminals a relatively low voltage high amperage current having amperage greatly exceeding the rated amperage of a particular protective device which is to be subjected to a simulated abnormal service current, and delivering to another one of said pairs of terminals a relatively low voltage high amperage current having amperage moderately exceeding the rated amperage of said particular protective device, means for removably connecting said particular protective device selectively across either of said pairs of terminals, thereby to subject the protective device selectively to a current condition simulative of a relatively heavy overload condition in regular service and to a current condition simulative of a relatively moderate overload condition in regular service.

4. Apparatus for effecting visible circuit-interrupting action of fusible protective devices in response to simulated abnormalities encountered in regular service, comprising a transformer designed to receive relatively high voltage, low amperage current and to deliver a relatively low voltage high amperage secondary current having amperage equal to the amperage of the maximum abnormal current which is to be simulated in the apparatus, a support for the transformer including a surface having terminals exposed thereon, means for removably connecting a protective device across said terminals preparatory to subjecting it to a current simulative of a service circuit abnormality, said protective device having amperage rating substantially below the amperage of said secondary current, means directly attachable to a service line and including a second transformer, for receiving relatively high voltage surge currents from the service line and for delivering a transformed reduced voltage surge current of increased amperage to the first mentioned transformer, and means for directing the secondary current of said first mentioned transformer through the protective device while its response thereto is readily observable.

5. Apparatus for visibly demonstrating circuit-protecting characteristics of fusible protective devices, comprising a support having exposed terminals thereon, means associated with the support for receiving relatively high voltage, low amperage current and delivering relatively low voltage high amperage current having amperage simulative of an abnormal amperage in a service circuit for which particular protective devices are designed to provide protection, means for connecting a plurality of said particular protective devices in series across said terminals preparatory to demonstrating their characteristics, and means for directing the simulated abnormal current through the series-connected protective devices thereby to visibly demonstrate the circuit-interrupting action of whichever protective device has the lesser amount of time-delay.

6. Apparatus for exhibiting fusible protective devices in the process of fusing, comprising a support having a display face, a plurality of pairs of terminals insulated from each other on said face and across which fusible protective devices which are to be exhibited may be selectively mounted, means for securing a said fusible protective device selectively across either of the said plurality of pairs of terminals, a transformer associated with the support, means for connecting the primary winding of the transformer to a source of electrical energy, means connecting one end of the secondary winding of the transformer to one terminal of each of two pairs of said terminals and connecting the other end of said secondary winding to the second terminal of only one pair of said two pairs of terminals, a mid-portion of said secondary winding being connected to the second terminal of the other pair of said two pairs of terminals, and manual control means for directing the maximum secondary current of the transformer through an exhibited fusible protective device when it is mounted across the terminals of one of said two pairs of terminals and for directing approximately one-half the maximum secondary current of the transformer through an exhibited fusible protective device when it is mounted across the terminals of the other pair of said two pairs of terminals.

WILLIAM S. EDSALL.

REFERENCES CITED

The following references are of record in the file of this patent:

UNITED STATES PATENTS

| Number | Name | Date |
|---|---|---|
| 930,474 | Hood | Aug. 10, 1909 |
| 968,448 | Cary | Aug. 23, 1910 |
| 1,175,335 | Bremer | Mar. 14, 1916 |
| 2,058,037 | Rigandi | Oct. 20, 1936 |
| 2,274,296 | Hughes et al. | Feb. 24, 1942 |
| 2,366,290 | Rudd | Jan. 2, 1945 |
| 2,478,999 | Briseno | Aug. 16, 1949 |